(12) United States Patent
Nagai

(10) Patent No.: US 6,733,872 B2
(45) Date of Patent: May 11, 2004

(54) LAMINATED GLASS

(75) Inventor: Kuniko Nagai, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 34 days.

(21) Appl. No.: 10/085,706

(22) Filed: Mar. 1, 2002

(65) Prior Publication Data

US 2002/0150744 A1 Oct. 17, 2002

(30) Foreign Application Priority Data

Mar. 1, 2001 (JP) ........................................ 2001-056974

(51) Int. Cl.[7] .................. B32B 7/02; B32B 17/10; C03C 27/12
(52) U.S. Cl. ................. 428/215; 428/220; 428/328; 428/329; 428/331; 428/425.5; 428/425.6; 428/429; 428/430; 428/437; 428/441; 428/442
(58) Field of Search ................. 428/215, 220, 428/328, 329, 331, 425.5, 425.6, 429, 430, 437, 441, 442

(56) References Cited

U.S. PATENT DOCUMENTS

| | | | |
|---|---|---|---|
| 5,368,917 A | 11/1994 | Rehfeld et al. | 428/215 |
| 5,478,615 A | 12/1995 | Rehfeld et al. | 428/34 |
| 5,830,568 A | * 11/1998 | Kondo | 428/328 |
| 6,074,732 A | * 6/2000 | Garnier et al. | 428/215 |

FOREIGN PATENT DOCUMENTS

| | | | |
|---|---|---|---|
| EP | 0488110 A1 | * 6/1992 | |
| WO | WO 01/42158 | 6/2001 | |
| WO | WO 01/44132 | 6/2001 | |

\* cited by examiner

*Primary Examiner*—D. S. Nakarani
(74) *Attorney, Agent, or Firm*—Oblon, Spivak, McClelland, Maier & Neustadt, P.C.

(57) ABSTRACT

A laminated glass having a surface density of at most 12 kg/m$^2$ and comprising a plurality of glass sheets laminated one on another with an interliner provided between the respective adjacent glass sheets, wherein the interliner has an ability to shield infrared rays and an ability to insulate sounds having a frequency of 5,000 Hz.

50 Claims, 3 Drawing Sheets

12a: Sound insulating layer
12b: Infrared shielding layer
12c: Infrared shielding layer 22a: Sound insulating layer
22b: Infrared shielding layer 32, 33a, 34a: Sound insulating/infrared shielding layer
33b, 34b: PVB layer
33c, 34c: PVB layer 42a: Sound insulating/infrared shielding layer
42b: Sound insulating/infrared shielding layer
41c: Glass sheet 42c: Sound insulating layer
41c: Glass sheet
42d: Infrared shielding layer

LAMINATED GLASS

BACKGROUND OF THE INVENTION

1. Field of the Invention

The present invention relates to a laminated glass.

2. Discussion of Background

In recent years, it has been desired to reduce the weight of an automobile body to improve the gasoline mileage of the automobile. For the weight reduction, it is necessary to reduce the weights of various components constituting the automobile body, and such weight reduction is required also for a window glass. To reduce the weight of a window glass, it is necessary to either reduce the size of the glass sheet to be used or to reduce its thickness, and in order to reduce the weight without changing the design of the shape of the window glass, it is necessary to reduce the thickness of the glass sheet.

However, if the glass sheet is made thin for weight reduction, there will be a problem such that the effect for shielding solar radiation energy by the glass sheet will decrease, and the internal temperature of the automobile will increase, whereby the load for air conditioning will be excessive. The solar radiation transmittance of a glass sheet changes in the order of the second power of the thickness of the glass sheet. Accordingly, if a glass sheet is made thin even slightly, the solar radiation energy passing through the glass sheet sharply increases.

Further, by making the glass sheet thin, the sound-insulating performance of the glass sheet decreases, whereby there will be a problem that sounds outside the car will enter into the car, and the comfortableness in the car will thereby be deteriorated. Generally, a material has a nature that the higher the mass per unit area (the surface density), the higher the sound insulating ability, and the higher the frequency of the sound, the easier the insulation of the sound (mass law). Such a sound insulating ability is evaluated by a sound transmission loss TL ($=10 \cdot \log_{10}(i/\tau)[dB]$, wherein $\tau = E_t/E_i$, wherein $E_t$ is the energy of the sound passed through the substance, and $E_i$ is the energy of the sound entered into the substance), and the larger the TL, the better the sound-insulating ability.

On the other hand, in a case where a substance has a flat sheet shape, it may undergo resonance phenomena at a specific frequency, whereby the sound transmission loss tends to be lower than the mass law (coincidence effects). Such a frequency at which the sound transmission loss decreases, is called a coincidence resonance frequency, and it shifts towards a high frequency side when the thickness of the glass sheet is made thin, whereby noises in a high frequency region generated outside of the car tend to enter into the car.

Thus, heretofore, making a glass sheet thin in order to reduce the weight of an automobile, has brought about two problems i.e. decrease in the infrared shielding ability and decrease in the sound insulating ability.

SUMMARY OF THE INVENTION

Accordingly, it is an object of the present invention to provide a laminated glass whereby weight reduction can be realized without lowering the infrared shielding ability and the sound insulating ability.

The present invention has been made to solve the above problems and provides a laminated glass having a surface density of at most 12 kg/m² and comprising a plurality of glass sheets laminated one on another with an interliner provided between the respective adjacent glass sheets, wherein the interliner has an ability to shield infrared rays and an ability to insulate sounds having a frequency of 5,000 Hz.

DETAILED DESCRIPTION OF THE PREFERRED EMBODIMENTS

Now, the principle of the present invention will be described.

The present inventors have confirmed that when the thickness of a glass sheet is reduced so that the surface density of a conventional laminated glass becomes to be at most 12 kg/m² in order to reduce the weight of an automobile, the sound insulating ability and the infrared shielding ability of the laminated glass will decrease. Particularly with respect to the sound insulating ability of a laminated glass, it has been found that when the surface density of the laminated glass is made to be at most 12 kg/m², the coincidence resonance frequency will shift towards a high frequency side in the vicinity of 5,000 Hz, whereby the sound insulating ability will remarkably decrease. Sounds in this frequency region are substantially contained in e.g. wind whistling noises during driving a car, vibration noises of wipers, etc. and squeak noises of an automobile body, and they are certainly undesirable sounds to the passengers. Accordingly, in order to improve the comfortableness of sounds in the car, it is important to insulate sounds in the vicinity of a frequency of 5,000 Hz.

Now, various embodiments of the present invention will be described with reference to the drawings.

First Embodiment

Figure 1A:
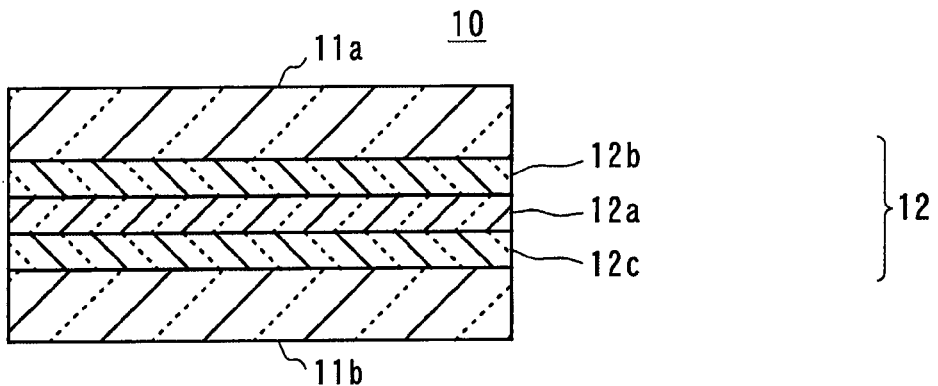
FIGS. 1A and 1B are cross-sectional views illustrating a first embodiment of the laminated glass of the present invention.

FIG. 1A is a cross-sectional view illustrating a first embodiment of the laminated glass of the present invention. The laminated glass 10 is prepared by laminating two glass sheets 11a and 11b and an interliner 12 interposed between these glass sheets. The interliner 12 has a construction such that an infrared shielding layer 12c made of a transparent organic resin as the main material and having infrared shielding fine particles incorporated and dispersed therein, a sound-insulating layer 12a for insulating sounds having a frequency of 5,000 Hz, and an infrared shielding layer 12b having infrared shielding fine particles incorporated and dispersed therein, are sequentially laminated. Further, infrared shielding fine particles may be incorporated in the sound insulating layer 12a.

Figure 1B:
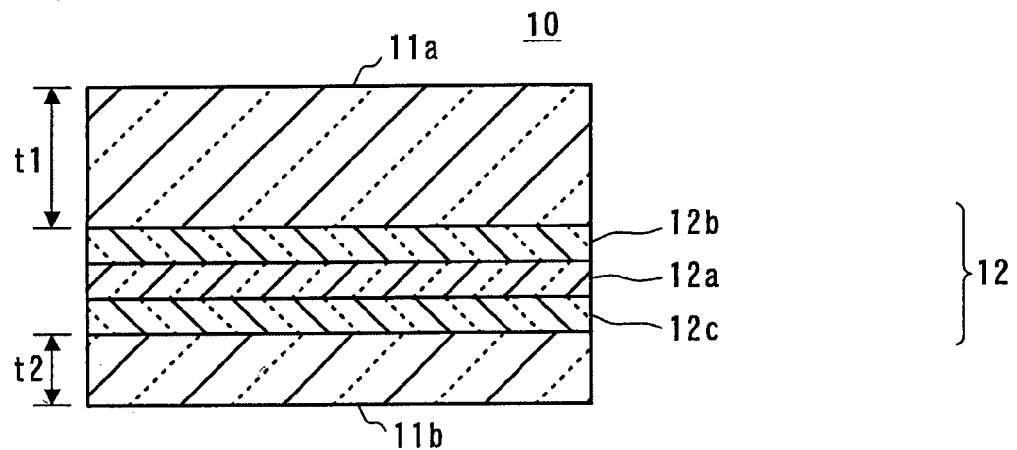

Here, in order to make the mass per 1 m² (the surface density) of the laminated glass at most 12 kg, it is necessary to make the thickness of each glass sheet constituting the laminated glass from 1.0 to 2.5 mm, particularly preferably from 1.0 to 2.0 mm. Further, in a case where the laminated glass is constituted by two glass sheets, it is possible to reduce the weight of the window glass and to secure adequate strength as a window for an automobile, by making the thickness of one glass sheet from 1.0 to 1.6 mm and the thickness of another glass sheet from 1.5 to 2.0 mm. Namely, as shown in FIG. 1B, the thickness t1 of the glass sheet 11a is made thicker than the thickness t2 of the glass sheet 11b (t1>t2). In this case, it is preferred to mount the laminated glass to an automobile so that the thick glass sheet will be located outside and the thin glass sheet is located inside, whereby it is possible to improve the impact resistance against a flying object such as a small stone.

Further, the shape of the laminated glass according to this embodiment may be a flat sheet shape or a curved shape. Further, it is particularly preferred that the interliner according to this embodiment has the following characteristics. Namely, it is preferred to select an interliner satisfying that the sound transmittance loss TL of sounds having a frequency of 5,000 Hz is at least 35 dB, when the sound transmittance loss is measured by means of a standard laminated glass (size: 1,480 (mm)×850 (mm)).

Second Embodiment

Figure 2:
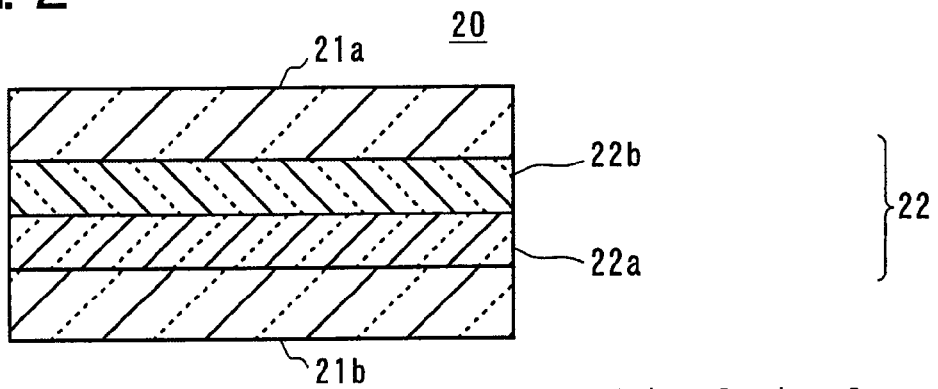
FIG. 2 is a cross-sectional view illustrating a second embodiment of the laminated glass of the present invention.

FIG. 2 is a cross-sectional view illustrating a second embodiment of the laminated glass of the present invention. The laminated glass 20 is prepared by laminating two glass sheets 21a and 21b and an interliner 22 interposed between these glass sheets. The interliner 22 has a construction such that a sound-insulating layer 22a made of a transparent organic resin as a main material and designed to insulate sounds having a frequency of 5,000 Hz, and an infrared shielding layer 22b having infrared shielding fine particles incorporated and dispersed therein, are sequentially laminated. Further, the infrared shielding fine particles may be incorporated to the sound-insulating layer 22a. Further, the thicknesses of the glass sheets 21a and 21b are the same as in the case of the first embodiment.

Third Embodiment

Figure 3A:
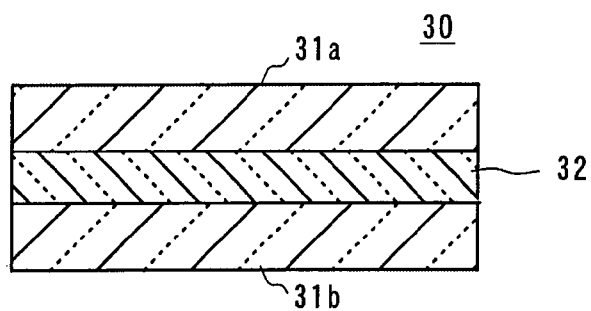
FIGS. 3A to 3C are cross-sectional views illustrating a third embodiment of the laminated glass of the present invention.

FIG. 3A is a cross-sectional view illustrating a third embodiment of the laminated glass of the present invention. The laminated glass 30 is prepared by laminating two glass sheets 31a and 31b, and an interliner 32 interposed between these glass sheets. The interliner 32 is made of the same transparent organic resin as used in the sound-insulating layers 12a and 22a in the first and second embodiments, as the main material, and further has infrared shielding fine particles incorporated and dispersed therein.

Figure 3B:
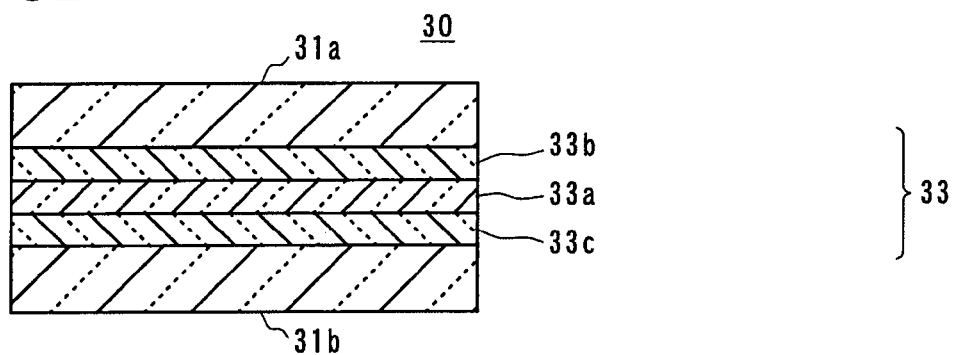
Figure 3C:
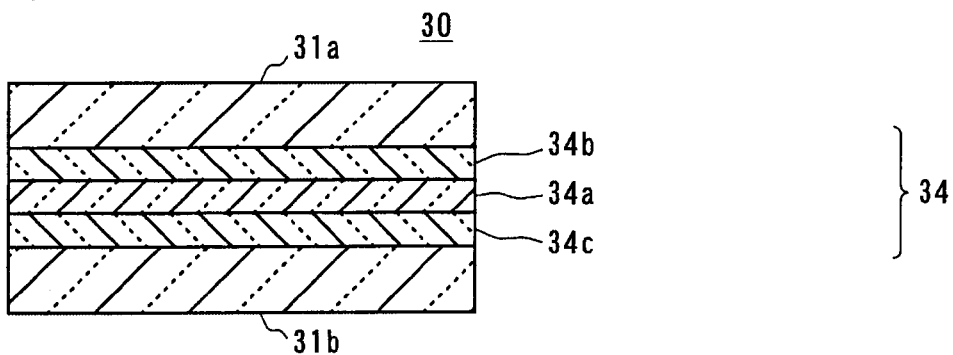

In a case where the interliner 32 is bonded to the glass sheets 31a and 31b with sufficient strength, the interliner 32 may be constituted solely of the sound-insulating/infrared-shielding layer, as shown in FIG. 3A. However, if the adhesive strength to the glass sheets is weak, the interliner 33 is preferably constructed by having polyethylene terephthalate (PET) layers 33b and 33c interposed between the sound-insulating/infrared-shielding layer 33a and the glass sheets 31a and 31b, respectively, as shown in FIG. 3B. Further, as shown in FIG. 3C, the interliner 34 may be constructed by having PVB layers 34b and 34c interposed between the sound-insulating/infrared-shielding layer 34a and the glass sheets 31a and 31b, respectively.

Fourth Embodiment

Figure 4A:
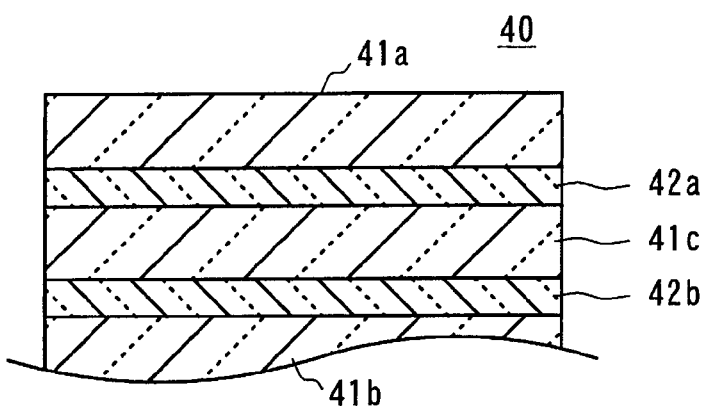
FIGS. 4A and 4B are cross-sectional views illustrating a fourth embodiment of the laminated glass of the present invention.
Figure 4B:
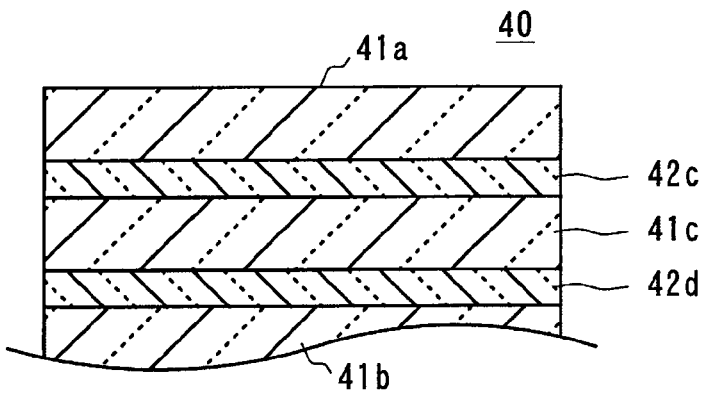

FIG. 4A is a cross-sectional view illustrating a fourth embodiment of the laminated glass of the present invention. The laminated glass 40 is prepared by laminating at least three glass sheets 41a, 41b, 41c . . . and interliners 42a, 42b . . . interposed between the adjacent glass sheets. The interliners 42a, 42b . . . are made of the same transparent organic resin as used for the sound-insulating layers 12a and 22a in the first and second embodiments, as the main material, and further has infrared shielding fine particles incorporated and dispersed therein. Further, as shown in FIG. 4B, the interliner 42c is made to be a sound-insulating layer, and the interliner 42d is made to be an infrared shielding layer.

In the forgoing, four embodiments have been described, but the present invention is by no means restricted to them, and various changes may be made within a range not to depart from the gist of the present invention. For example, a layer other than the above-described, may further be laminated within a range not to influence over the optical characteristics of the laminated glass, or a metal layer and/or metal oxide layer may be coated on the glass sheets.

Composition of the Interliner

Now, the composition of the interliner to be used in the above embodiments will be described.

The sound-insulating layer 12a is a known organic resin layer having a sound transmittance loss at a frequency of 5,000 Hz of at most 35 dB. From the viewpoint of production efficiency of the interliner 12, it is preferred to prepare the sound-insulating layer 12a by means of a material whereby the film shape can be maintained by itself. For example, a PVB-modified material, an ethylene/vinyl acetate copolymer (EVA) type material, a urethane resin material, a vinyl chloride resin material or a silicone resin material, may be employed.

However, in order to increase the sound transmittance loss at a frequency of 5,000 Hz, it is effective to lower the rigidity of the interliner as far as possible from the viewpoint of the coincidence effects. Accordingly, it is preferred to employ one brittled to a limit where the film state can be maintained (for example, in a state like a cooled and solidified agar or gelatin). Specifically, it is preferred to employ, as a sound-insulating layer, a film having a smaller Rockwell hardness value and a larger modulus of elasticity and/or elongation than a polyvinylbutyral (PVB) film which is commonly used for an interliner of a laminated glass for automobile window.

Infrared Shielding Fine Particles

The average particle size of the infrared shielding fine particles incorporated and dispersed in the infrared shielding layer or the sound-insulating layer, is preferably at most 0.2 $\mu$m, particularly preferably from 0.15 to 0.001 $\mu$m. As the material for the infrared shielding fine particles, inorganic fine particles made of a metal, oxide, nitride, sulfide or silicide of Re, Hf, Nb, Sn, Ti, Si, Zn, Zr, Fe, Al, Cr, Co, Ce, In, Ni, Ag, Cu, Pt, Mn, Ta, W, V and/or Mo, or made of such a material doped with Sb or F, may be mentioned.

Further, these fine particles may be used as a single product or composite. Further, it is effective to use a mixture having such a single product or composite mixed with an organic resin or a coated product having such a single product or composite coated with an organic resin, in order to obtain various properties required for automobiles. Further, it is possible to use an organic infrared absorber of a phthalocyanine type or the like as the infrared shielding fine particles.

On the other hand, as the infrared shielding fine particles, at least one or both of antimony-doped tin oxide (ATO) fine particles and tin-doped indium oxide (ITO) fine particles, may be employed. The ATO fine particles and the ITO fine particles are excellent in the infrared shielding ability, and when they are incorporated to the interliner even in a small amount, the desired infrared shielding ability can be realized. Further, the ITO fine particles are superior to the ATO fine particles in the infrared shielding ability, it is particularly preferred to employ the ITO fine particles as the infrared shielding fine particles.

In the present invention, it is preferred that the infrared shielding fine particles are incorporated and dispersed in the material constituting the interliner in an amount of from 0.1 to 10 parts by mass per 100 parts by mass of the total mass of the material constituting the interliner, because by adjusting the amount to at least 0.1 part by mass, a laminated glass having the desired infrared shielding ability can be realized, and by adjusting the amount to at most 10 parts by mass, the haze of the laminated glass can be minimized, and the appearance of the laminated glass can be made good.

Further, in a case where the interliner is constituted by a single layer, the blend proportion of from 0.1 to 10 parts by mass per 100 parts by mass of the total amount of the material constituting the interliner, means that the proportion is from 0.1 to 10 parts by mass per 100 parts by mass of the total mass of the interliner in such a single layer interliner. On the other hand, in a case where the interliner is constituted by a plurality of layers, it means that the sum of masses of infrared shielding fine particles incorporated and dispersed in the respective layers, is from 0.1 to 10 parts by mass per 100 parts by mass of the sum of masses of all layers constituting the interliner.

Process for Preparing the Interliner

Now, a process for producing the interliner will be described.

Firstly, the interliners illustrated in FIG. 1A and FIG. 2 will be prepared as follows.

Infrared shielding fine particles are dispersed in a plasticizer for an infrared shielding layer. Then, the plasticizer having infrared shielding fine particles dispersed therein, is added and dispersed in a resin solution for the infrared shielding layer, followed by mixing and kneading to obtain a resin material to be used for the infrared shielding layer. Then, this resin material and a resin material to be used for a sound-insulating layer are formed into films by e.g. extrusion molding to obtain an interliner illustrated in FIG. 1A or FIG. 2. The respective resin materials may be simultaneously extrusion molded, or separately extrusion molded films may later be put together, to form the interliner.

Further, the interliner illustrated in FIG. 3A may be prepared as follows.

To incorporate and disperse infrared shielding fine particles in a sound-insulating layer, infrared shielding fine particles are dispersed in a plasticizer for a sound-insulating layer. Then, the plasticizer having the infrared shielding fine particles dispersed therein, is added and dispersed in a resin solution for the sound-insulating layer, followed by mixing and kneading to obtain a resin material for the sound-insulating layer containing the infrared shielding fine particles. Then, this resin material for the sound-insulating layer is subjected to e.g. extrusion molding to obtain the interliner illustrated in FIG. 3A.

Further, at the time of adding and dispersing the plasticizer, other various additives may be added to the resin solution for the interliner. Such additives may, for example, be various pigments, organic ultraviolet absorbers or organic infrared absorbers. Further, as such a plasticizer or solvent for the resin solution for the interliner, a known plasticizer or solvent may be used.

Colored Transparent Glass Sheet

In a case where the infrared shielding ability is to be imparted to the interliner by means of infrared shielding fine particles, the infrared shielding ability can be improved by increasing the blend amount of the infrared shielding fine particles. However, if the blend amount of the infrared shielding fine particles is too much, there will be a problem that the haze value of the interliner decreases. Accordingly, it is preferred to use the interliner having the above infrared shielding ability in combination with a colored transparent glass sheet having the infrared shielding ability.

As the colored transparent glass sheet, it is preferred to employ a green-colored soda lime silica glass. Namely, it is preferred to employ a glass sheet made of soda lime silica glass containing from 0.3 to 1% by mass of total iron calculated as $Fe_2O_3$. It is particularly preferred to employ a glass sheet made of a soda lime silica glass wherein the mass of FeO calculated as $Fe_2O_3$ in the total iron calculated as $Fe_2O_3$ and represented by mass percentage, is from 20 to 40%. Further, it is preferred that the sum of contents of total iron calculated as $Fe_2O_3$ contained in the respective glass sheets constituting a laminated glass specimen of 1 cm² cut out from the laminated glass, is from 2 to 7 mg.

Now, Examples 1 and 2 of the present invention and Comparative Examples 1 to 4 will be described. However, it should be understood that the present invention is by no means restricted by such Examples. The laminated glass in each Example is prepared by the following procedure.

Namely, a sandwich assembly having an interliner sandwiched between two glass sheets, was prepared, and this sandwich assembly was put into an aluminum pack, deaerated for 10 minutes under reduced pressure at a level of an absolute pressure of 10 kPa and maintained in the deaerated state for 30 minutes in an oven of 120° C. Thereafter, the sandwich assembly having the glass sheets and the interliner provisionally bonded, was put into an autoclave and subjected to thermo-compression bonding under a pressure of 1.3 MPa at a temperature of 135° C., to obtain a laminated glass.

Then, with respect to the prepared laminated glass, the surface density (kg/m²), the solar radiation transmittance $T_e$(%) and the sound-insulating property (the sound transmittance loss TL [dB] of sounds having a frequency of 5,000 Hz of a standard laminated glass having a size of 1,480 (mm)×850 (mm)), of the laminated glass, were measured. The solar radiation transmittance $T_e$ was obtained in accordance with JIS R3106 after measuring the transmittance by means of a spectrophotometer (U4000, manufactured by Hitachi, Ltd.). The sound-insulating property was measured in accordance with JIS A1416 in an atmosphere at a temperature of 25° C. at intervals of ⅓ octave. The measured results are shown in Table 1.

EXAMPLE 1

A laminated glass of Example 1 was constructed by glass sheets (thicknesses of the respective glass sheets: 1.4 mm and 1.8 mm) made of green colored soda lime silica glass (Sungreen, manufactured by Asahi Glass Company, Limited) and an interliner made of EVA.

The interliner was prepared as follows.

99.5 parts by mass of film-form EVA (manufactured by Bridgestone Corporation) pulverized into pellets and 0.5 part by mass of ITO fine particles (average particle size: at most 0.02 μm), were kneaded and mixed by a three-roll mill at about 180° C. for about 15 minutes. Then, the obtained film-forming resin material was filmed in a thickness of about 0.8 mm by means of an embossing machine at a temperature of about 190° C. and wound up on a roll. Then, in order to improve the dispersed state of the infrared shielding fine particles, the above step was repeated twice to obtain an interliner 32 of FIG. 3A.

EXAMPLE 2

A laminated glass was prepared in the same manner as in Example 1 except that in Example 2, the interliner was prepared as follows.

The interliner of Example 2 was prepared by laminating the after-mentioned layers a and b. 25 g of 3 GH (triethylene glycol bis(2-ethyl butyrate)) having ITO fine particles (average particle size: at most 0.02 μm) dispersed therein (amount of ITO fine particles: 20% by mass), 115 g of usual 3GH and 360 g of PVB were respectively prepared, and they were put into a PVB resin, followed by kneading and mixing by a three-roll mill at about 70° C. for about 15 minutes. Then, the obtained film-forming resin material was filmed in a thickness of about 0.4 mm by means of an embossing machine at a temperature of about 190° C. and wound up on a roll to obtain a layer a. Then, on the layer a, a sound-insulating interliner having a thickness of about 0.4 mm Eslex film acoustic, manufactured by Sekisui Chemical Co., Ltd.: layer b) was overlaid to obtain an interliner 22 of FIG. 2.

Comparative Example 1

A laminated glass was prepared in the same manner as in Example 1 except that a PVB film having a thickness of 0.8 mm was used as an interliner, and two glass sheets made of green-colored soda lime silica glass and having a thickness of 2.3 mm, were used.

Comparative Example 2

A laminated glass was prepared in the same manner as in Comparative Example 1 except that the thicknesses of the two glass sheets were changed to 1.4 mm and 1.8 mm, respectively.

Comparative Example 3

A laminated glass was prepared in the same manner as in Example 1, except that no ITO fine particles were dispersed in the interliner.

Comparative Example 4

A laminated glass was prepared in the same manner as in Example 2 except that the layer a having a thickness of about 0.8 mm was used alone as an interliner.

TABLE 1

| | Surface density of glass sheet ($kg/m^2$) | Solar radiation transmittance ($T_e$ (%)) | Sound transmission loss at 5,000 Hz (TL(dB)) |
|---|---|---|---|
| Example 1 | 8.8 | 45 | 36 |
| Example 2 | 8.9 | 45 | 37 |
| Comparative Example 1 | 12.4 | 52 | 38 |
| Comparative Example 2 | 8.9 | 58 | 34 |
| Comparative Example 3 | 8.9 | 58 | 36 |
| Comparative Example 4 | 8.9 | 45 | 34 |

As is evident from the above results, in Examples 1 and 2, deterioration of the infrared shielding ability and the sound-insulating ability can be prevented, in spite of the fact that the surface density is not more than 12 $kg/m^2$.

As described in the foregoing, the present invention provides a laminated glass, whereby weight reduction of an automobile can be accomplished while avoiding a disadvantage such as deterioration of the infrared shielding ability and deterioration of the sound-insulating ability. Particularly, the laminated glass of the present invention can effectively shield sounds having a frequency in the vicinity of 5,000 Hz which impair the comfortableness in the car.

Further, the present invention is applicable not only to a front glass or a door glass of an automobile, but also applicable to a window glass of other vehicles or air crafts, buildings, etc.

The entire disclosure of Japanese Patent Application No. 2001-56974 filed on Mar. 1, 2001 including specification, claims, drawings and summary are incorporated herein by reference in its entirety.

What is claimed is:

1. A laminated glass having a surface density of at most 12 $kg/^2$ and comprising a plurality of glass sheets laminated one on another with an interliner provided between the respective adjacent glass sheets, wherein the interliner has an ability to shield infrared rays and an ability to insulate sounds having a frequency of 5,000 Hz;

wherein the interliner has a multi-layer structure; and wherein at least one layer constituting the multi-layer structure has the ability to insulate sounds having a frequency of 5,000 Hz, and other layer(s) constituting the multi-layer structure have the ability to shield infrared rays.

2. The laminated glass according to claim 1, wherein said interliner has the ability to insulate sounds which are characterized by a sound transmittance loss at a frequency of 5,000 Hz of at least 35 dB when the sound transmittance loss is measured by means of a standard laminated glass having a flat sheet shape and a size of 1,480 (mm)×850 (mm) as viewed from the front.

3. The laminated glass according to claim 1, wherein the interliner has infrared shielding fine particles incorporated and dispersed therein.

4. The laminated glass according to claim 3, wherein the infrared shielding fine particles are inorganic fine particles made of a metal, oxide, nitride, sulfide or silicide of Re, Hf, Nb, Sn, Ti, Si, Zn, Zr, Fe, Al, Cr, Co, Ce, In, Ni, Ag, Cu, Pt, Mn, Ta, W, V and/or Mo, or made of such a material doped with Sb or F, or a composite made of such inorganic fine particles.

5. The laminated glass according to claim 4, wherein the infrared shielding fine particles are a mixture having a single product or composite of the inorganic fine particles mixed to an organic resin, or a coated product having a single product or composite of the inorganic fine particles coated with an organic resin.

6. The laminated glass according to claim 3, wherein the infrared shielding fine particles are tin oxide fine particles doped with antimony, or indium oxide fine particles doped with tin.

7. The laminated glass according to claim 3, wherein the infrared shielding fine particles are an organic infrared absorber.

8. The laminated glass according to claim 7, wherein the organic infrared absorber is a phthalocyanine type material.

9. The laminated glass according to claim 3, wherein the infrared shielding fine particles have an average particle size of at most 0.2 μm.

10. The laminated glass according to claim 3, wherein the infrared shielding fine particles have an average particle size of from 0.15 to 0.001 μm.

11. The laminated glass according to claim 3, wherein the infrared shielding fine particles are incorporated and dispersed in the material constituting the interliner in a proportion of from 0.1 to 10 parts by mass per 100 parts by mass of the total mass of the material constituting the interliner.

12. The laminated glass according to claim 1, wherein at least one glass sheet among the plurality of glass sheets is made of a colored transparent glass.

13. The laminated glass according to claim 12, wherein the colored transparent glass is a green-colored soda lime silica glass.

14. The laminated glass according to claim 13, wherein the colored transparent glass is a soda lime silica glass containing from 0.3 to 10% by mass of total iron calculated as $Fe_2O_3$.

15. The laminated glass according to claim 13, wherein the colored transparent glass is a soda lime silica glass wherein the mass of FeO calculated as $Fe_2O_3$ in the total iron calculated as $Fe_2O_3$ and represented by mass percentage is from 20 to 40%.

16. The laminated glass according to claim 13, wherein the sum of contents of total iron calculated as $Fe_2O_3$ contained in the respective glass sheets constituting a laminated glass specimen of 1 cm$^2$ cut out from the laminated glass, is from 2 to 7 mg.

17. The laminated glass according to claim 1, wherein the glass sheets have a thickness of from 1.0 to 2.5 mm.

18. The laminated glass according to claim 1, wherein the glass sheets have a thickness of from 1.0 to 2.0 mm.

19. The laminated glass according to claim 1, wherein the interliner is sandwiched between a first glass sheet having a thickness of from 1.0 to 1.6 mm and a second glass sheet having a thickness of from 1.5 to 2.0 mm.

20. The laminated glass according to claim 19, wherein said second glass sheet has a thickness which is greater than said first glass sheet.

21. The laminated glass according to claim 1, wherein the interliner is made of at least one member selected from the group consisting of a polyvinyl butyral (PVB) modified material, an ethylene/vinyl acetate copolymer (EVA) material, a urethane resin material, a vinyl chloride resin material and a silicone resin material.

22. The laminated glass according to claim 1, wherein the laminated glass is used as a window glass for an automobile.

23. The laminated glass according to claim 1, wherein the interliner has at least three layers.

24. The laminated glass according to claim 23, wherein the layer having the ability to insulate sounds having a frequency of 5,000 Hz is interposed between other layers.

25. A laminated glass having a surface density of at most 12 kg/m$^2$ and comprising a plurality of glass sheets laminated one on another with an interliner provided between the respective adjacent glass sheets, wherein the interliner has an ability to shield infrared rays and an ability to insulate sounds having a frequency of 5,000 Hz;
   wherein the interliner is sandwiched between a first glass sheet having a thickness of from 1.0 to 1.6 mm and a second glass sheet having a thickness of from 1.5 to 2.0 mm; and
   wherein said second glass sheet has a thickness which is greater than said first glass sheet.

26. The laminated glass according to claim 25, wherein said interliner has the ability to insulate sounds which are characterized by a sound transmittance loss at a frequency of 5,000 Hz of at least 35 dB when the sound transmittance loss is measured by means of a standard laminated glass having a flat sheet shape and a size of 1,480 (mm)×850 (mm) as viewed from the front.

27. The laminated glass according to claim 25, wherein the interliner has a multi-layer structure.

28. The laminated glass according to claim 27, wherein the interliner is one having a layer comprising an organic resin material for insulating sounds having a frequency of 5,000 Hz and infrared shielding fine particles incorporated therein, sandwiched between two layers made of polyvinyl butyral or polyethylene terephthalate.

29. The laminated glass according to claim 27, wherein at least one layer constituting the multi-layer structure has the ability to insulate sounds having a frequency of 5,000 Hz, and other layers constituting the multi-layer structure have the ability to shield infrared rays.

30. The laminated glass according to claim 25, wherein the interliner has infrared shielding fine particles incorporated and dispersed therein.

31. The laminated glass according to claim 30, wherein the infrared shielding fine particles are inorganic fine particles made of a metal, oxide, nitride, sulfide or silicide of Re, Hf, Nb, Sn, Ti, Si, Zn, Zr, Fe, Al, Cr, Co, Ce, In, Ni, Ag, Cu, Pt, Mn, Ta, W, V and/or Mo, or made of such a material doped with Sb or F, or a composite made of such inorganic fine particles.

32. The laminated glass according to claim 31, wherein the infrared shielding fine particles are a mixture having a single product or composite of the inorganic fine particles mixed to an organic resin, or a coated product having a single product or composite of the inorganic fine particles coated with an organic resin.

33. The laminated glass according to claim 30, wherein the infrared shielding fine particles are tin oxide fine particles doped with antimony, or indium oxide fine particles doped with tin.

34. The laminated glass according to claim 30, wherein the infrared shielding fine particles are an organic infrared absorber.

35. The laminated glass according to claim 34, wherein the organic infrared absorber is a phthalocyanine type material.

36. The laminated glass according to claim 30, wherein the infrared shielding fine particles have an average particle size of at most 0.2 µm.

37. The laminated glass according to claim 30, wherein the infrared shielding fine particles have an average particle size of from 0.15 to 0.001 µm.

38. The laminated glass according to claim 30, wherein the infrared shielding fine particles are incorporated and dispersed in the material constituting the interliner in a proportion of from 0.1 to 10 parts by mass per 100 parts by mass of the total mass of the material constituting the interliner.

39. The laminated glass according to claim 25, wherein at least one glass sheet among the plurality of glass sheets is made of a colored transparent glass.

40. The laminated glass according to claim 39, wherein the colored transparent glass is a green-colored soda lime silica glass.

41. The laminated glass according to claim 40, wherein the colored transparent glass is a soda lime silica glass containing from 0.3 to 10% by mass of total iron calculated as $Fe_2O_3$.

42. The laminated glass according to claim 40, wherein the colored transparent glass is a soda lime silica glass wherein the mass of FeO calculated as $Fe_2O_3$ in the total iron calculated as $Fe_2O_3$ and represented by mass percentage is from 20 to 40%.

43. The laminated glass according to claim 40, wherein the sum of contents of total iron calculated as $Fe_2O_3$ contained in the respective glass sheets constituting a laminated glass specimen of 1 cm$^2$ cut out from the laminated glass, is from 2 to 7 mg.

44. The laminated glass according to claim 25, wherein the glass sheets have a thickness of from 1.0 to 2.5 mm.

45. The laminated glass according to claim 25, wherein the glass sheets have a thickness of from 1.0 to 2.0 mm.

46. The laminated glass according to claim 25, wherein the interliner is sandwiched between a first glass sheet having a thickness of from 1.0 to 1.6 mm and a second glass sheet having a thickness of from 1.5 to 2.0 mm.

47. The laminated glass according to claim 25, wherein the interliner is made of at least one member selected from the group consisting of a polyvinyl butyral (PVB) modified material, an ethylene/vinyl acetate copolymer (EVA) material, a urethane resin material, a vinyl chloride resin material and a silicone resin material.

48. The laminated glass according to claim 25, wherein the laminated glass is used as a window glass for an automobile.

49. The laminated glass according to claim 25, wherein the interliner has at least three layers.

50. The laminated glass according to claim 49, wherein the layer having the ability to insulate sounds having a frequency of 5,000 Hz is interposed between other layers.

* * * * *